May 4, 1954  H. A. MILLER  2,677,577
SPRINKLING DEVICE
Filed May 18, 1953
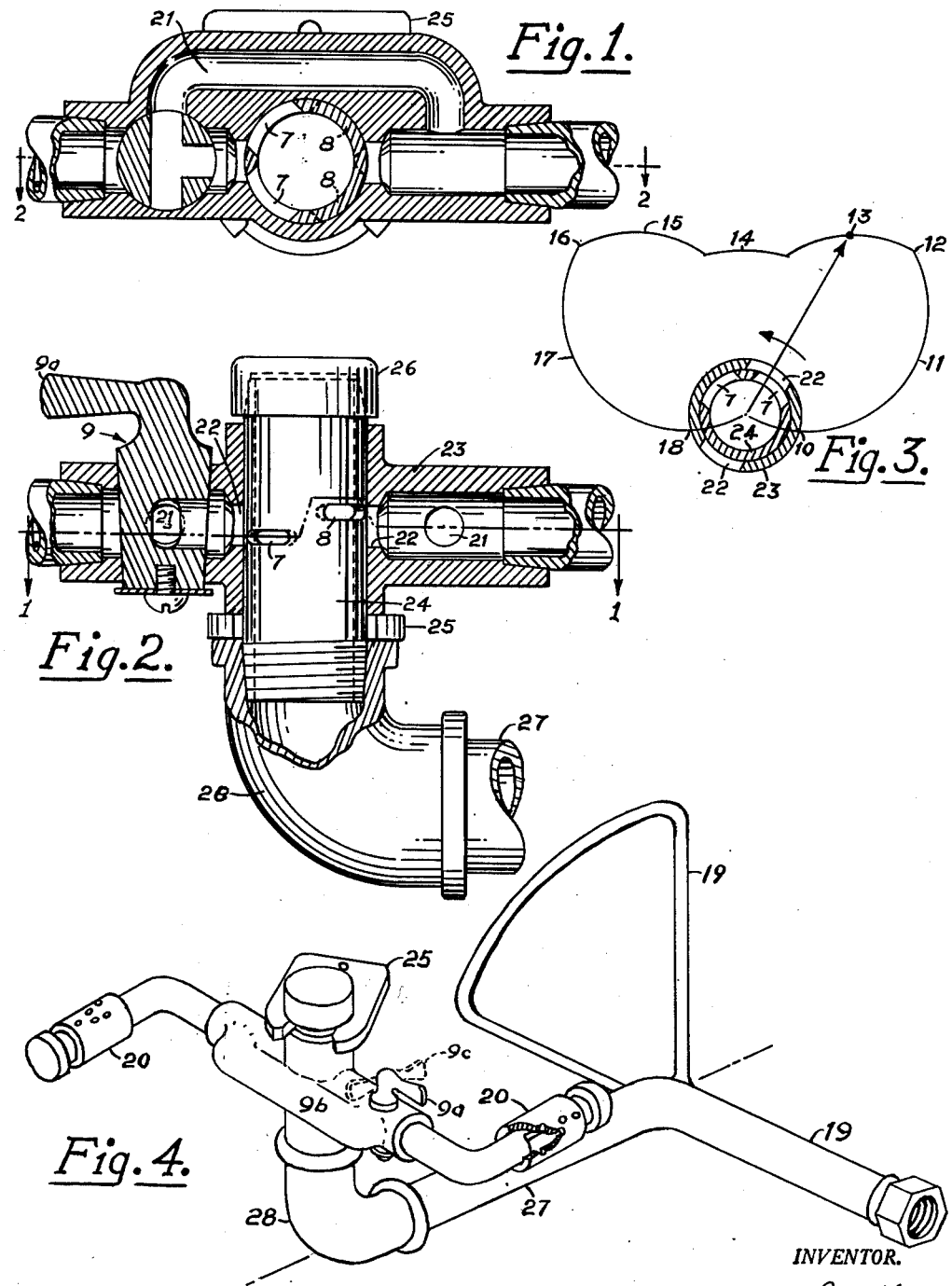
INVENTOR.
BY Harold A. Miller Patented May 4, 1954

2,677,577

UNITED STATES PATENT OFFICE 2,677,577

SPRINKLING DEVICE

Harold A. Miller, San Diego, Calif.

Application May 18, 1953, Serial No. 355,430

3 Claims. (Cl. 299—18)

The invention relates to improvements in sprinkling devices in which a rotating hub with ports operates in conjunction with a stationary axle with ports; and the objects of the improvement are, first, to provide a variable opening sleeve valve as hub rotates; second, to afford facilities for easily adjusting for a combination of practical sprinkling patterns.

One form of the invention is illustrated in the accompanying drawing in which—

Fig. 1 is a view taken on the line 1—1 of Fig. 2.

Fig. 2 is a view taken on the line 2—2 of Fig. 1.

Fig. 3 shows the operating ports and the curve of the relative water volume rate through the port combination as the hub and its port rotate around on a two port axle.

Fig. 4 is a view in perspective of the complete sprinkling device in universal form of the invention.

The hub 23 requires one port through to each jet arm used. The axle 24 contains in its wall two basic ports 7 spaced ninety degrees apart. A cap 26 is usually screwed on the upper end of said axle. An elbow 28 is usually attached on the lower end of the axle thus making a basic four piece assembly consisting of axle, hub, cap, and elbow. A stand 27 to keep said axle vertical may be attached.

As the hub rotates, each of its ports 22 will register with said two basic ports 7 of axle producing a changing flow for a "half square" (Fig. 3) for one revolution as follows: off (10)—increasing (11)—maximum (12)—decreasing (13)—constant (14)—increasing (15)—maximum (16)—decreasing (17)—off (18).

This causes each jet arm to produce an on and off one way flow as the hub rotates. This makes convenient sprinkling from a border. It makes it possible to pick up the sprinkler while it is operating without getting wet. It is practical for sprinkling areas which are rectangular in shape, and long narrow strips next to a wall.

Option Number 1.—All four ports 7, 8 are spaced ninety degrees around the axle but the two auxiliary ports 8 are spaced more than their width nearer one end of the axle than the two basic ports 7. The hub is shifted along the axle by adding a snap ring spacer 25, so that the much wider hub port 22 as pictured in Fig. 2 then registers with four instead of two axle ports. This shift provides four peaks 12 of water flow whenever the hub port 22 is over the axle port 7, 8, and minimum flow 14 whenever the hub port 22 is over the smaller total opening of the ends of two axle ports. One hub port is usually used with an oscillating sprinkler head. For a rotating sprinkler, the hub contains one to six ports 22 for use of a corresponding one to six jet arms.

Option Number 2.—A two port hub contains a hand valve 9 and by-pass 21 that permit water flow from one of the hub ports 22 to three positions of the valve handle (9a, 9b, 9c): (1) to its own jet arm 9b providing a half square sprinkled pattern; (2) to other jet arm 9a as pictured in Fig. 1, providing a one jet arm square pattern; (3) to both jet arms 9c providing accented corners. This last provides a method to accent the corners of a square to compensate for the relatively much higher air resistance at the corners 12 than at the sides 14 in large area sprinkling.

Option 3.—This uses the axle and spacer described in Option 1 and the hub described in Option 2. Fig. 1 and Fig. 2 show this completely. This makes available a two jet arm optimum square with a faster water discharge. This also provides nearly full hydrant pressure at the spray nozzles which may be desirable when very low water pressure is available. This compromises the corners of a square a little, in favor of increased sprinkling area in such cases. The three position valve 9 and spacer 25 are pictured for this compromise square in Fig. 1.

Supplementary Option Number 4 (Fig. 4).—The sprinkler is equipped with a two position stand 19. In this case a stand holds the axle in either vertical or horizontal position. The horizontal axle has its two basic ports 7 pointed upward. These produce an on and off high angle spray (11, 12, 13, 14, 15, 16, 17) as the hub rotates. The flow is off while jets are pointed toward the ground (18, 10). Adjustable width and direction jets 20 may be used so operator can set the spray exactly to the desired rectangular pattern. This completes Supplementary Option 4.

The following provides port size for optimum corners. Assumptions (1) and (2):

(1) Air resistance is neglected.

(2) Radius of point 12 Fig. 3 is 1.414 times radius of point 14.

My mathematical results follow (1) and (2):

(1) Cord length of ports 7, 8, 22 as pictured in Fig. 3 and Fig. 1 is 50.554 per cent of axle diameter at the port.

(2) Width of axle port 7, 8 as pictured in Fig. 2 is such that its flow area is 1.414 times the constriction area of the jets on one jet arm.

The width of the hub ports 22 as pictured in Fig. 2 causes a calculated minimum bearing pressure, for longer bearing life, when it is two and two-thirds times as wide as axle ports 7, 8. For other practical reasons it may be much wider.

I am aware that prior to my invention sprinklers have been made for one or more winged patterns including the four winged square. I therefore do not claim such combination broadly; but I claim:

1. The combination a sprinkler of an axle containing two basic ports formed through the wall of said axle, a hub secured for rotation around said axle containing two ports through hub wall, a three position valve in the channel between one of said hub ports and its exit, and a by-pass from said valve to other hub port channel.

2. The combination in a sprinkler of a tubular cylindrical axle containing two basic ports formed through the wall of said axle and two auxiliary ports placed more than their width nearer one end of said axle than said basic ports, a hub secured for rotation around said axle containing two ports through hub wall, a spacer to reposition said hub along said axle, a three position valve between one hub port and its exit, and a by-pass from said valve to channel of other hub port.

3. The combination in a sprinkler of a cylindrical tubular axle containing two basic ports formed through the wall of said axle and two auxiliary ports placed more than their width nearer one end of said axle than said basic ports, a hub secured for rotation around said axle containing two ports through hub wall, a spacer to reposition said hub along said axle, a channel from each hub port to its exit, a by-pass connecting said two hub port channels, a valve in one of said channels and in the by-pass, a two position stand attached to one end of said axle, a cap at opposite ends of said axle, a conduit attached to each hub port exit, and an adjustable width and direction jet nozzle attached to each conduit.

References Cited in the file of this patent

UNITED STATES PATENTS

| Number | Name | Date |
|---|---|---|
| 1,766,514 | Henry | June 24, 1930 |
| 1,953,837 | Thorold | Apr. 3, 1934 |
| 2,238,849 | Kastberg | Apr. 15, 1941 |
| 2,336,725 | Englehart | Dec. 14, 1943 |
| 2,532,356 | Brown | Dec. 5, 1950 |
| 2,620,233 | Brown | Dec. 2, 1952 |

FOREIGN PATENTS

| Number | Country | Date |
|---|---|---|
| 555,810 | France | July 6, 1923 |